(No Model.)
A. & B. A. MALONE.
CHURN DASHER.
No. 321,831. Patented July 7, 1885.
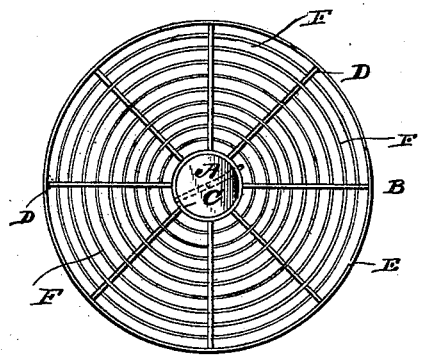
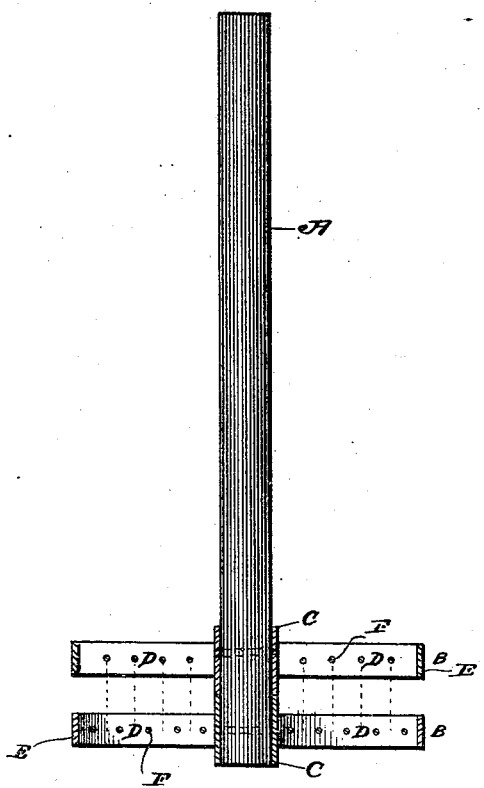
WITNESSES
INVENTORS
Alex. Malone,
Bettie A. Malone,
By their Attorneys

UNITED STATES PATENT OFFICE.

ALEXANDER MALONE AND BETTIE ADELLA MALONE, OF FRANKLIN, ASSIGNORS OF THREE-FOURTHS TO JOHN B. MONTAGUE AND JAMES T. BOOKER, OF SIMPSON COUNTY, KENTUCKY.

CHURN-DASHER.

SPECIFICATION forming part of Letters Patent No. 321,831, dated July 7, 1885.

Application filed March 16, 1885. (No model.)

*To all whom it may concern:*

Be it known that we, ALEXANDER MALONE and BETTIE ADELLA MALONE, citizens of the United States, residing at Franklin, in the county of Simpson and State of Kentucky, have invented a new and useful Improvement in Churn-Dashers, of which the following is a specification, reference being had to the accompanying drawings.

Our invention relates to an improvement in churn-dashers; and it consists in the peculiar construction and combination of devices, that will be more fully set forth hereinafter.

In the accompanying drawings, Figure 1 is a plan view of a churn-dasher embodying our invention. Fig. 2 is a vertical sectional view of the same.

A represents the dasher-rod, to the lower end of which are secured the dashers B, one above the other a suitable distance, as shown. Each of the dashers consists of a central hub, C, which is secured to the dasher-rod, and from which projects the radial spokes D, which are connected at their outer ends by a circular rim, E. Each of the spokes is provided with a series of openings at equal distances apart, which series of openings extend from the hub to the rim, and through these openings pass the concentric wire rings F.

The dashers are secured to the dasher-rod in such a position with relation to each other that the spokes of the lower dasher are out of line vertically with the spokes of the upper dasher, and the concentric rings of the dashers are secured to the spokes in such a manner that the rings of the lower dasher are out of line with those of the upper dasher.

It will be observed that the spokes D are broad and thin, and that they are secured to the hubs with the broad sides vertical, and thus the spokes D form, practically, blades for holding the concentric rings and cutting or whipping the cream as the dasher moves therein. Owing to the thinness of the blades or spokes, the dasher encounters very little resistance as it is operated in the cream, and the friction of the dasher with the cream is thereby reduced to a minimum without in any way impairing the efficiency of the dasher or lengthening the time required to make butter, and materially lessening the labor of working the dasher. In order to give sufficient rigidity to the spokes or blades, the rims E are employed. These rims are formed similarly to the blades or spokes, and serve as additional cutters for the cream, and thereby add to the efficiency of the dasher.

By having the rings and spokes of one dasher out of line with the rings and spokes of the other dasher the cream will be cut or whipped as the dasher descends in different vertical lines by each of the dashers, thereby thoroughly agitating the cream.

A churn-dasher thus constructed is exceedingly cheap and simple, is easily cleaned, and is very efficient in operation.

Instead of forming the dashers of the separate wires, spokes, and rims as here shown, we may make them of cast-iron, in which case the dashers will be formed integrally, as will be readily understood.

Having thus described our invention, we claim—

The combination of the dasher-rod with the dashers, said dashers consisting each of a central hub, thin radial spokes or blades projecting therefrom, the thin circular rim connecting the outer ends of the spokes, and concentric rings between the hub and the rim, the rims and spokes or blades being adapted to cut or whip the cream without materially displacing it, the dashers being so arranged and secured to the dasher-rod that the spokes and rings of one are out of line vertically with the spokes and rings of the other, substantially as described.

In testimony that we claim the foregoing as our own we have hereunto affixed our signatures in presence of two witnesses.

ALEXANDER MALONE.
BETTIE ADELLA MALONE.

Witnesses:
JOHN A. NORRIS,
S. N. FORLINE.